US012393867B2

(12) United States Patent
Vaishampayan et al.

(10) Patent No.: US 12,393,867 B2
(45) Date of Patent: Aug. 19, 2025

(54) EXECUTION OF SEGMENTED MACHINE LEARNING MODELS

(71) Applicant: Apple Inc., Cupertino, CA (US)

(72) Inventors: Umesh S. Vaishampayan, Santa Clara, CA (US); Gaurav Kapoor, Santa Clara, CA (US); Kit-Man Wan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1102 days.

(21) Appl. No.: 17/347,563

(22) Filed: Jun. 14, 2021

(65) Prior Publication Data

US 2021/0398021 A1 Dec. 23, 2021

Related U.S. Application Data

(60) Provisional application No. 63/041,765, filed on Jun. 19, 2020.

(51) Int. Cl.
*G06N 20/00* (2019.01)
*G06F 9/50* (2006.01)
*G06F 40/20* (2020.01)

(52) U.S. Cl.
CPC .......... *G06N 20/00* (2019.01); *G06F 9/5016* (2013.01); *G06F 9/5038* (2013.01); *G06F 40/20* (2020.01); *G06F 2209/5017* (2013.01); *G06F 2209/506* (2013.01)

(58) Field of Classification Search
CPC ....... G06N 20/00; G06F 40/20; G06F 9/5016; G06F 9/5038; G06F 2209/5017; G06F 2209/506
See application file for complete search history.

(56) References Cited

U.S. PATENT DOCUMENTS

| | | | | |
|---|---|---|---|---|
| 4,984,176 A * | 1/1991 | Van den Heuvel | .... | G06N 20/00 706/46 |
| 7,188,234 B2 * | 3/2007 | Wu | ........ | G06F 9/3832 712/225 |
| 8,645,609 B2 * | 2/2014 | Ko | ........ | G11C 7/1075 711/E12.007 |
| 11,501,142 B1 * | 11/2022 | Wu | ........ | G06N 3/045 |
| 11,610,102 B1 * | 3/2023 | Zejda | ........ | G06N 3/063 |
| 2013/0232186 A1 * | 9/2013 | Ingram | ........ | G06F 3/048 709/203 |
| 2015/0379072 A1 * | 12/2015 | Dirac | ........ | G06N 20/00 707/693 |
| 2017/0323224 A1 * | 11/2017 | Bruestle | ........ | G06F 7/582 |
| 2020/0349413 A1 * | 11/2020 | Muthusamy | ........ | G06N 3/045 |

* cited by examiner

*Primary Examiner* — Kc Chen
(74) *Attorney, Agent, or Firm* — BAKERHOSTETLER

(57) ABSTRACT

A device implementing a system to execute machine learning models from memory includes at least one processor configured to receive a request to provide an input to one or more machine learning (ML) models arranged into a graph of connected layers, the one or more ML models stored in the first type of memory. The at least one processor is further configured to divide the graph of connected layers into a plurality of segments such that at least two of the plurality of segments concurrently fits within allocated space of the second type of memory. The at least one processor is further configured to cause the input to be processed through the first segment of the plurality of segments using the second type of memory while a second segment of the plurality of segments is concurrently loaded from the first type of memory into the second type of memory.

20 Claims, 10 Drawing Sheets

EXECUTION OF SEGMENTED MACHINE LEARNING MODELS

CROSS REFERENCE TO RELATED APPLICATIONS

This application claims the benefit of priority to U.S. Provisional Patent Application No. 63/041,765, entitled "EXECUTION OF SEGMENTED MACHINE LEARNING MODELS," filed on Jun. 19, 2020, the disclosure of which is hereby incorporated herein in its entirety.

TECHNICAL FIELD

The present description relates generally to execution of machine learning models, including methods and systems for efficient execution of machine learning models using limited amounts of volatile memory.

BACKGROUND

Machine learning (ML) models can be applied to solve a variety of useful computing tasks, for example in fields such as natural language processing and computer vision. To provide more accurate and relevant results, ML models have been growing in size. On the other hand, to meet increasing consumer and regulatory demands for power efficiency, mobile devices and other battery constrained devices may have limited amounts of high performance volatile memory available to execute ML models.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

As noted above, mobile devices and other battery constrained devices may have limited amounts of available volatile memory to execute ML models, which are continuing to increase in size. As a result, devices may need to load and unload ML models to and from volatile memory to support multiple ML models. However, this memory loading procedure may introduce significant latency before the ML models can be processed, reducing device responsiveness and providing a less than optimal user experience.

The subject system provides for loading and executing ML models from volatile memory to minimize latency. One or more ML models to be executed are stored in non-volatile memory and are arranged into a graph of connected layers. The graph is segmented such that at least two segments of the graph can be loaded into a pre-allocated (volatile) memory buffer of a determined size. In this manner, a first segment loaded into the memory buffer can be processed while a second segment is concurrently being loaded into the memory buffer. When processing of the first segment is complete, the first segment can be unloaded and a third segment can be loaded, concurrently with processing the second segment. By managing the buffer directly using segmented graph portions for parallel processing and volatile memory loading and unloading, busy waits from memory management overhead can be advantageously avoided.

Figure 1:
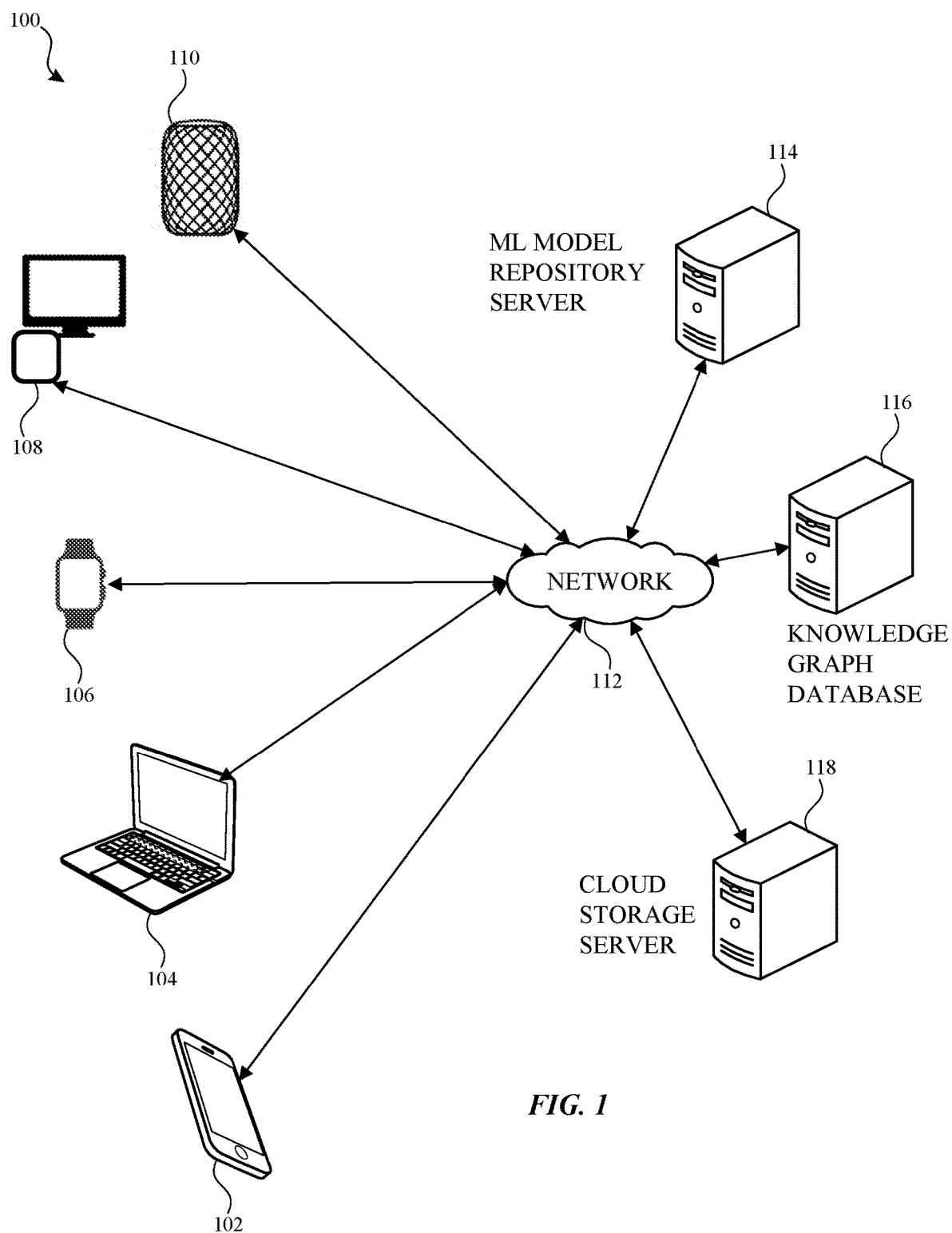
FIG. 1 illustrates an example network environment for executing machine learning models from memory, in accordance with one or more implementations.

FIG. 1 illustrates an example network environment for executing machine learning models from memory, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 104, 106, 108 and 110 (hereinafter "the electronic devices 102-110"), a ML model repository server 114, a knowledge graph database 116 and a cloud storage server 118 (hereinafter "the servers 114-118"), and a network 112. The network 112 may communicatively (directly or indirectly) couple, for example, any two or more of the electronic devices 102-110 and the servers 114-118. In one or more implementations, the network 112 may be an interconnected network of devices that may include, and/or may be communicatively coupled to, the Internet. In one or more implementations, the network 112 may correspond to a local area network (e.g., a Wi-Fi network) connecting one or more of the electronic devices 102-110. For explanatory purposes, the network environment 100 is illustrated in FIG. 1 as including electronic devices 102-110 and servers 114-118; however, the network environment 100 may include any number of electronic devices and any number of servers.

One or more of the electronic devices 102-110 may be, for example, a portable computing device such as a laptop computer, a smartphone, a smart speaker, a digital media player, a peripheral device (e.g., a digital camera, headphones), a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 104 is depicted as a laptop computer, the electronic device 106 is depicted as a smartwatch, and the electronic device 110 is depicted as a smart speaker. By way of example, the electronic device 108 is depicted as a digital media player (e.g., configured to receive digital data such as music and/or video and stream it to a television or other video display). In one or more implementations, the electronic device 108 may be integrated into the display device.

One or more of the electronic devices 102-110 may be configured to communicate or otherwise interact with one or more of the servers 114-118. Each of the electronic devices 102-110 may be, and/or may include all or part of, the device discussed below with respect to FIG. 2, and/or the electronic system discussed below with respect to FIG. 8.

In one or more implementations, the ML model repository server 114 may be configured to provide ML models for storage and execution on electronic devices 102-110. The provided ML models may be static to prevent changes to the ML models by electronic devices 102-110. The electronic devices 102-110 may periodically query ML model repository server 114 for updated ML models, or the updated ML models may be pushed to electronic devices 102-110. The knowledge graph database 116 may be configured to provide responses to queries that cannot be answered by local data alone on electronic devices 102-110. The cloud storage server 118 may be configured to store data (e.g., files such as documents and/or photos) associated with user accounts for download on user devices, to share and/or send data to other users, and/or to back-up (e.g., wirelessly) device data.

One or more of the servers 114-118 may be, and/or may include all or part of the electronic system discussed below with respect to FIG. 8. Each of the servers 114-118 may include one or more servers, such as a cloud of servers. For explanatory purposes, a single server is shown and discussed with respect to various operations for each of the servers 114-118. However, these and other operations discussed herein may be performed by one or more servers, and each different operation may be performed by the same or different servers.

Figure 2:
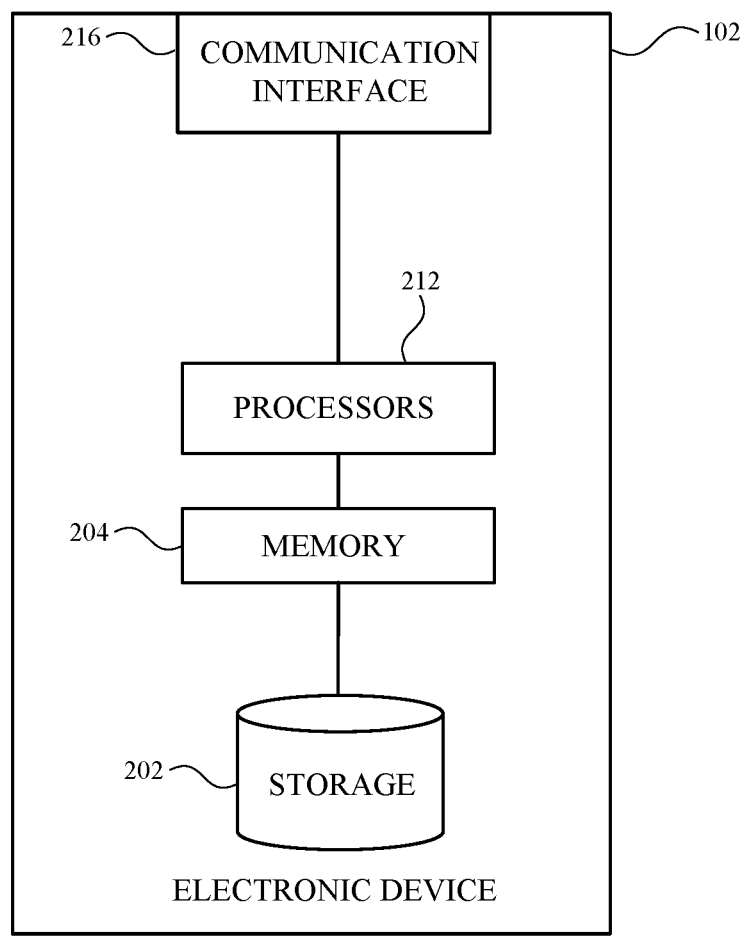
FIG. 2 illustrates an example device that may implement a system for executing machine learning models from memory, in accordance with one or more implementations.

FIG. 2 illustrates an example device that may implement a system for executing machine learning models from memory, in accordance with one or more implementations. For explanatory purposes, FIG. 2 is primarily described herein with reference to the electronic device 102 of FIG. 1. However, FIG. 2 may correspond to any of the electronic devices 102-110 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a storage 202, a memory 204, processors 212, and a communication interface 216. The storage 202 may correspond to a first type of memory, such as a non-volatile memory, including flash storage such as NAND flash and/or magnetic storage. The memory 204 may correspond to a second type of memory, such as a volatile memory, including dynamic random-access memory (DRAM). The memory 204 may include suitable logic, circuitry, and/or code that enable storage of various types of information such as received data, generated data, code, and/or configuration information.

The processors 212 may include suitable logic, circuitry, and/or code that enable processing data and/or controlling operations of the electronic device 102. In this regard, the processors 212 may be enabled to provide control signals to various other components of the electronic device 102. The processors 212 may also control transfers of data between various portions of the electronic device 102, including storage 202 and memory 204. Additionally, the processors 212 may enable implementation of an operating system or otherwise execute code to manage operations of the electronic device 102. The processors 212 may include general purpose processors, graphics processing units (GPUs), and/or specialized processors for ML processing.

In one or more implementations, the memory 204 may store one or more applications and/or frameworks for loading and processing ML models from memory 204. As described below with respect to FIG. 3, the ML models may be stored in a library within storage 202 and invoked according to defined use cases to complete various tasks on the electronic device 102.

The communication interface 216 may include suitable logic, circuitry, and/or code that enables wired or wireless communication, such as between any of the electronic devices 102-110 and one of more of the servers 114-118 over the network 112. The communication interface 216 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processors 212, the storage 202, the memory 204, the communication interface 216, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
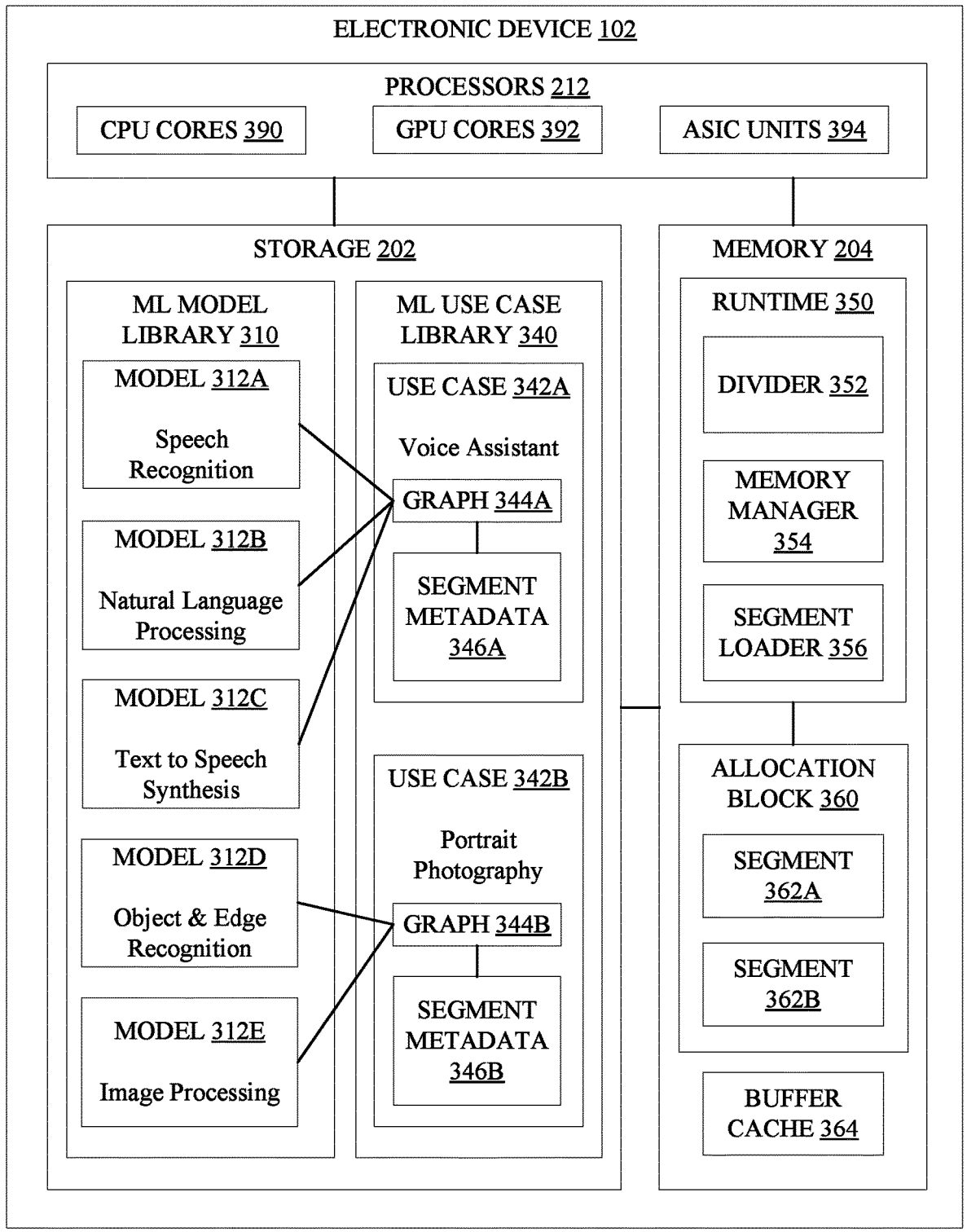
FIG. 3 illustrates an example block diagram of a device for executing machine learning models from memory, in accordance with one or more implementations.

FIG. 3 illustrates an example block diagram of a mobile device, or electronic device 102, for executing machine learning models from memory, in accordance with one or more implementations. As shown in FIG. 3, electronic device 102 may include storage 202, memory 204, and processors 212. Processors 212 may include CPU cores 390, GPU cores 392, and ASIC units 394, such as a specialized processor and/or a neural network processor. Storage 202 may include ML model library 310 and ML use case library 340. Memory 204 may include runtime 350, allocation block 360, and buffer cache 364.

ML model library 310 includes a library of (ML) models 312A-312E that may be periodically updated according to a defined update schedule or server-side push updates, as discussed above with respect to ML model repository server 114 of FIG. 1. Each model 312A-312E may define a plurality of layers for processing an input to provide an output, and may be configured to use one or more components of processors 212 according to the compute requirements of each respective ML model.

Since execution flows through the models 312A-312E may be deterministic for a variety of different inputs, the order and amount of computation to process data through models 312A-312E may be determined in advance during model construction and training time, which can be performed in advance of using models 312A-312E. Accordingly, the graphs 344A and 344B may be constructed in advance to minimize latency before processing and to optimize parallelism.

As shown in FIG. 3, each model 312A-312E may define a particular task to be performed. Model 312A may process voice input through a speech recognition model to generate text output. Model 312B may process a text input query through a natural language processing model to generate a response as a text output. In some implementations, a model such as model 312B may query an external data source outside of electronic device 102, such as knowledge graph database 116 of FIG. 1. Model 312C may process text input through a speech synthesis model to generate a voice output. Model 312D may process one or more input images through a vision model providing object and edge detection to generate image metadata output, including object regions. Model 312E may process one or more input images and image metadata through a vision model to generate a post-processed image output. The specific models 312A-312E are provided for explanatory purposes; the ML model library 310 may include any type or number of ML models. Further, while each model 312A-312E is shown to perform a complete discrete task, other implementations may also include portions of models that include sub-graphs of tasks, which can be combined into a larger graph to perform a desired task.

ML use case library 340 may define various use cases that combine the various models from ML model library 310. For example, consider use case 342A, corresponding to a voice assistant. When a voice assistant process detects a wake word or other user invocation, use case 342A may be invoked. Graph 344A of use case 342A includes model 312A to recognize a query from a voice input spoken by a user, model 312B to determine a response to the query, and model 312C to provide a voice output corresponding to the response.

Graph 344A of use case 342A may correspond to connected layers of models 312A, 312B, and 312C. Segment metadata 346A may define segments within graph 344A, which may be defined based on one or more factors, such as aligning to transitions between the models 312A-312C, minimizing state information carried between the segments, minimizing a size deviation between the segments, fitting at least two segments within allocation block 360, or otherwise separating according to logical or semantic breaks in graph 344A.

Similarly, consider use case 342B, corresponding to portrait photography, or blurring a background portion of a photo. When a camera process detects entry into a portrait mode, use case 342B may be invoked. Graph 344B of use case 342B includes model 312D to recognize objects and edges from images provided by one or more cameras of electronic device 102, and model 312E to perform image processing on the images using the detected object and edges, for example to blur a detected background. Graph 344B and segment metadata 346B may be structured in a similar manner as graph 344A and segment metadata 346A.

In some implementations, the ML use case library 340 may be pre-staged in storage 202 to avoid graph construction at runtime. In other implementations, the graphs and/or segment metadata may be partially or fully staged at runtime. Further, the graphs and the segment metadata may be formatted using data structures configured for minimal waiting on I/O operations. For example, the data structures may utilize an interleaved format optimized for parallel processing to reduce I/O overhead. The data structures may also be previously converted from other formats into a native format for processors 212.

Processors 212 may execute various processes in memory 204, including runtime 350. Runtime 350 may correspond to a background process that manages loading and execution of ML models. Organizer 352 may organize the ML models for processing, memory manager 354 may manage memory within allocation block 360, and segment loader 356 may manage loading of segments from storage 202 into allocation block 360 while directing processing of the segments by processors 212.

Organizer 352 may combine graphs according to stored segment metadata and/or various factors at runtime. For example, consider a case where a user uses a voice assistant to request taking a portrait mode selfie. In this case, organizer 352 may receive an indication of a task to invoke use case 342A for voice assistant and use case 342B for portrait photography. Organizer 352 may parse the task to form a combined graph from graphs 344A and 344B. Organizer 352 may also define the segments for the combined graph. The segments may be defined directly from segment metadata 346A and 346B, and/or from various factors evaluated at runtime, as discussed above. The segments may also be defined in response to determining that a total memory footprint of the combined graph exceeds the available space in allocation block 360.

Memory manager 354 may perform an allocation of allocation block 360 in memory 204, for example by performing an allocation call to a virtual memory manager. After the allocation call, memory manager 354 may directly manage allocation of segments read from storage 202, such as segment 362A and segment 362B, as well as handle free space management within the allocation block 360. In this manner, individual calls to the virtual memory manager can be avoided to reduce overhead and avoid stalls due to, e.g. zero fill faults and other memory management tasks. Further, since entire segments can be loaded at once rather than allocating and deallocating individual tensors and data structures, multiple memory management calls can be consolidated into fewer block operations that can be more efficiently performed by memory manager 354.

Segment loader 356 may perform the task of loading segments from storage 202 according to the graph and segment divisions provided by organizer 352. A buffer cache 364 may be provided to store a working set of data for processors 212 while processing segments within allocation block 360. As described in further detail below in conjunction with FIG. 6A-6C, segment loader 356 may load a segment, e.g. segment 362B, from storage 202 into allocation block 360 while processors 212 concurrently process a previously loaded segment, e.g. segment 362A. This concurrent loading and processing may repeat for each segment pair (or any number of segments that concurrently fit within the allocation block 360) for the combined graph defined by organizer 352. Further, prior to the loading and processing, segment loader 356 may provide hints to a power management module or closed loop performance control (CLPC) of electronic device 102, for example to immediately switch to a high performance mode rather than waiting for an automatic dynamic ramping.

Figure 4A:
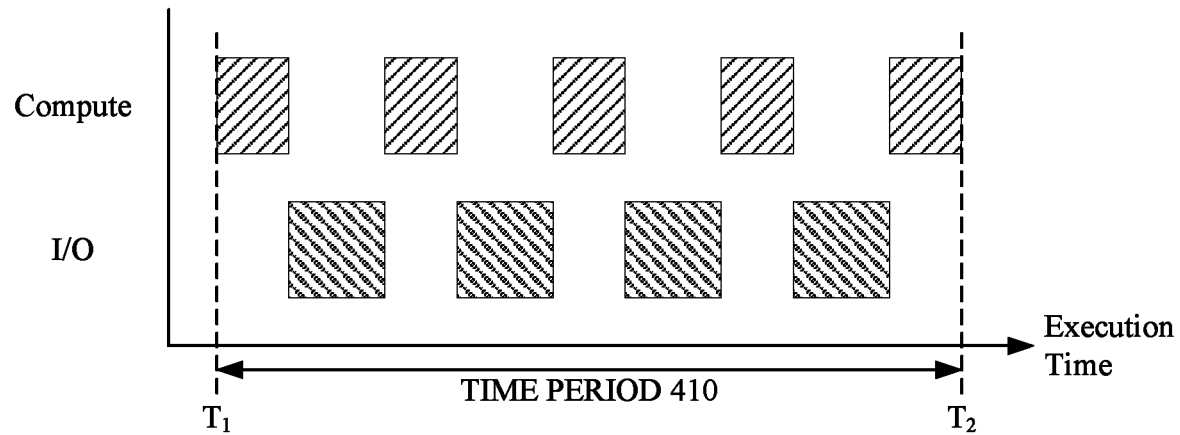
FIG. 4A illustrates an execution time graph for executing machine learning models from memory by allocating and deallocating the machine learning models.

FIG. 4A illustrates an execution time graph for executing machine learning models from memory by allocating and deallocating the machine learning models. For example, referring to FIG. 3, this may correspond to sequentially allocating, processing, and deallocating models 312A-312E using calls to a virtual memory manager without using runtime 350. As shown in FIG. 4A, compute power is starved of tasks to complete due to I/O stalls from the sequential loading and processing of ML models. As a result, a higher latency is incurred, as shown by time period 410 from $T_1$ to $T_2$.

Figure 4B:
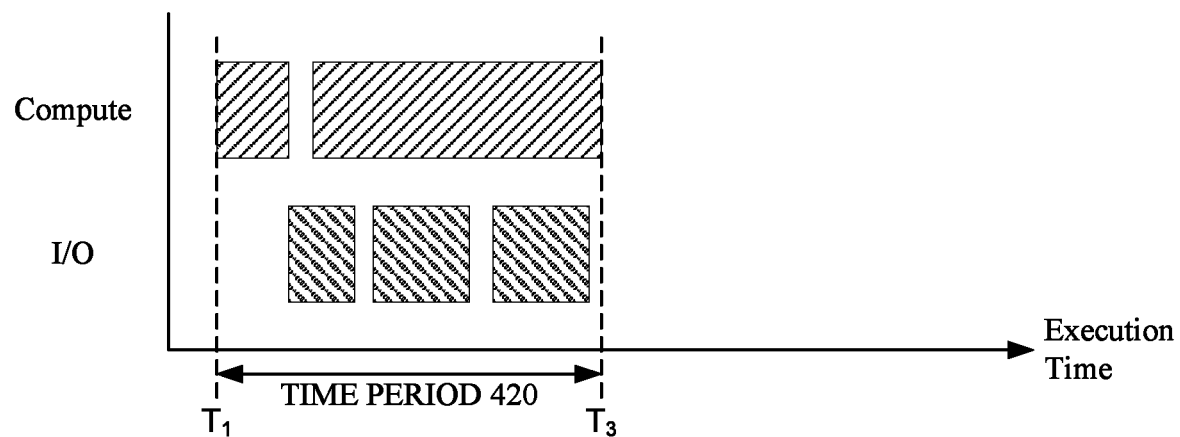
FIG. 4B illustrates an execution time graph for executing machine learning models from memory, in accordance with one or more implementations.

FIG. 4B illustrates an execution time graph for executing machine learning models from memory, in accordance with one or more implementations. For example, referring to FIG. 3, this may correspond to using runtime 350 to concurrently load and execute segments of the ML models. As shown in FIG. 4B, utilization of available compute power is greatly increased compared to FIG. 4A. As a result, a lower latency is incurred, as shown by time period 420 from $T_1$ to $T_3$, which may be significantly shorter than time period 410.

Figure 5:
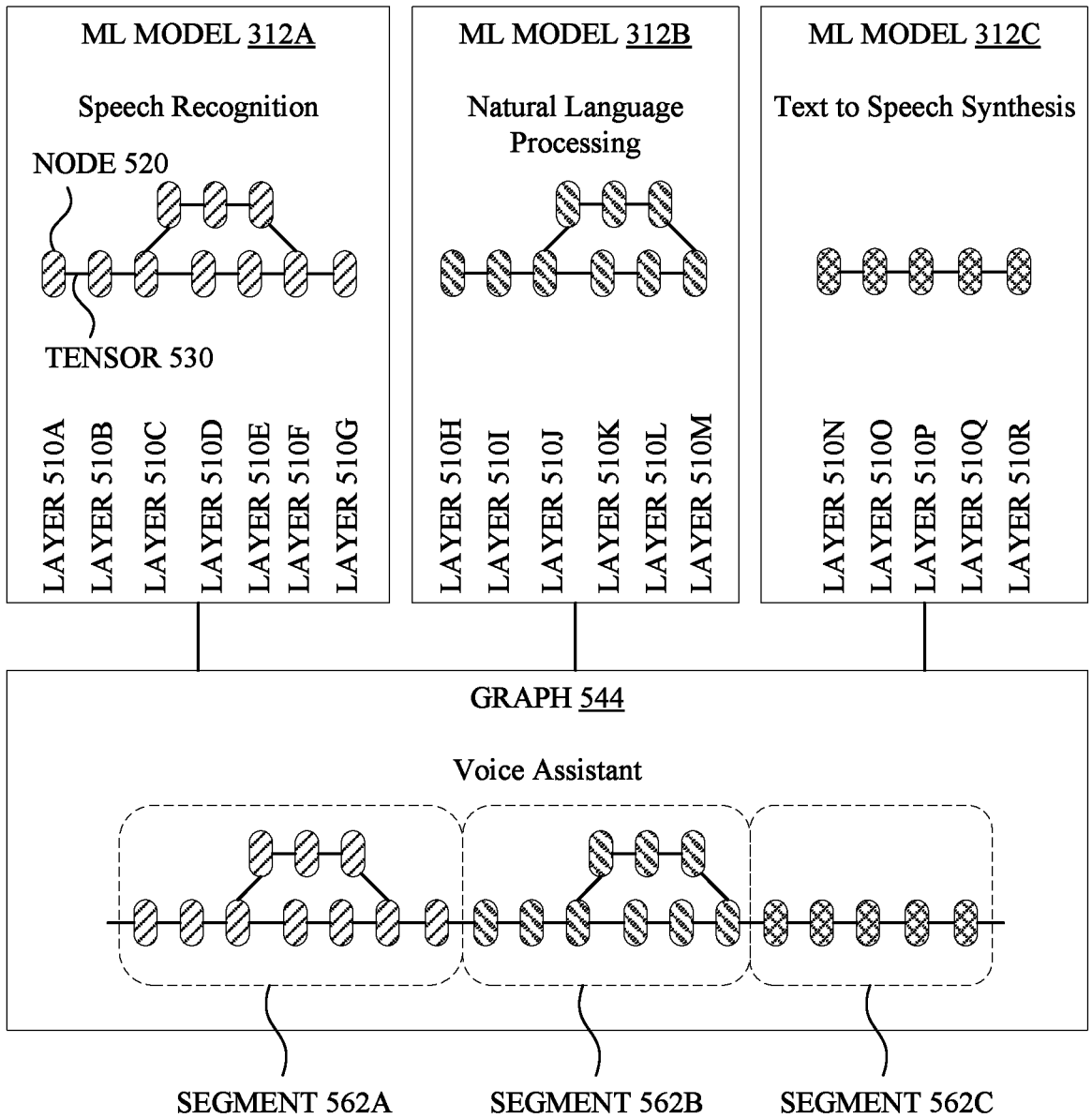
FIG. 5 illustrates an example block diagram of a graph of ML models arranged into connected layers, in accordance with one or more implementations.

FIG. 5 illustrates an example block diagram of a graph 544 of models 312A, 312B, and 312C arranged into connected layers, in accordance with one or more implementations. For example, referring to model 312A, layers 510A, 510B, 510C, 510D, 510E, 510F, and 510G are connected into a graph, with an exemplary node 520 and tensor 530 identified. Layers 510A, 510B, 510F, and 510G include a single node, whereas layers 510C, 510D, and 510E include two nodes. In a similar manner, model 312B includes a graph with layers 510G-510M, and model 312C includes a graph with layers 510N-510R.

As discussed above with respect to FIG. 3, organizer 352 may receive a request to initiate a voice assistant task, and may access corresponding use case 342A to arrange models 312A, 312B, and 312C into a combined graph, or graph 544, with segments 562A, 562B, and 562C connected together such that graph 544 includes layers 510A-510R. In some implementations, graph 544 may be pre-staged, for example by retrieving graph 344A from storage 202. As shown in graph 544, the segments 562A, 562B, and 562C can be divided from graph 544 to align with the transitions between models 312A-312C. However, as discussed above, organizer 352 may also use various other factors to divide graph 544 into segments.

Figure 6A:
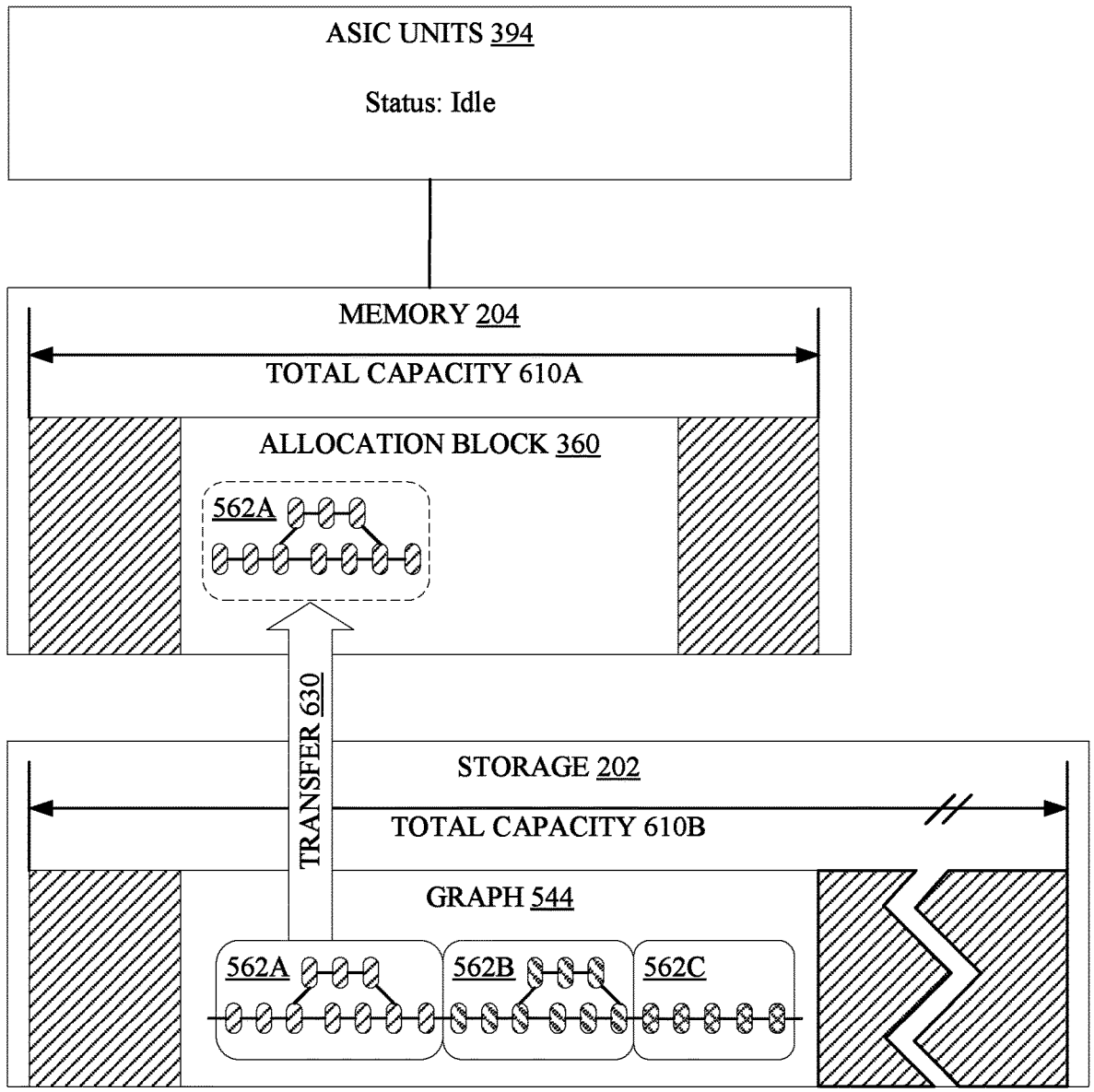
FIGS. 6A, 6B, and 6C illustrate example stages of loading and executing ML models from memory, in accordance with one or more implementations.
Figure 6B:
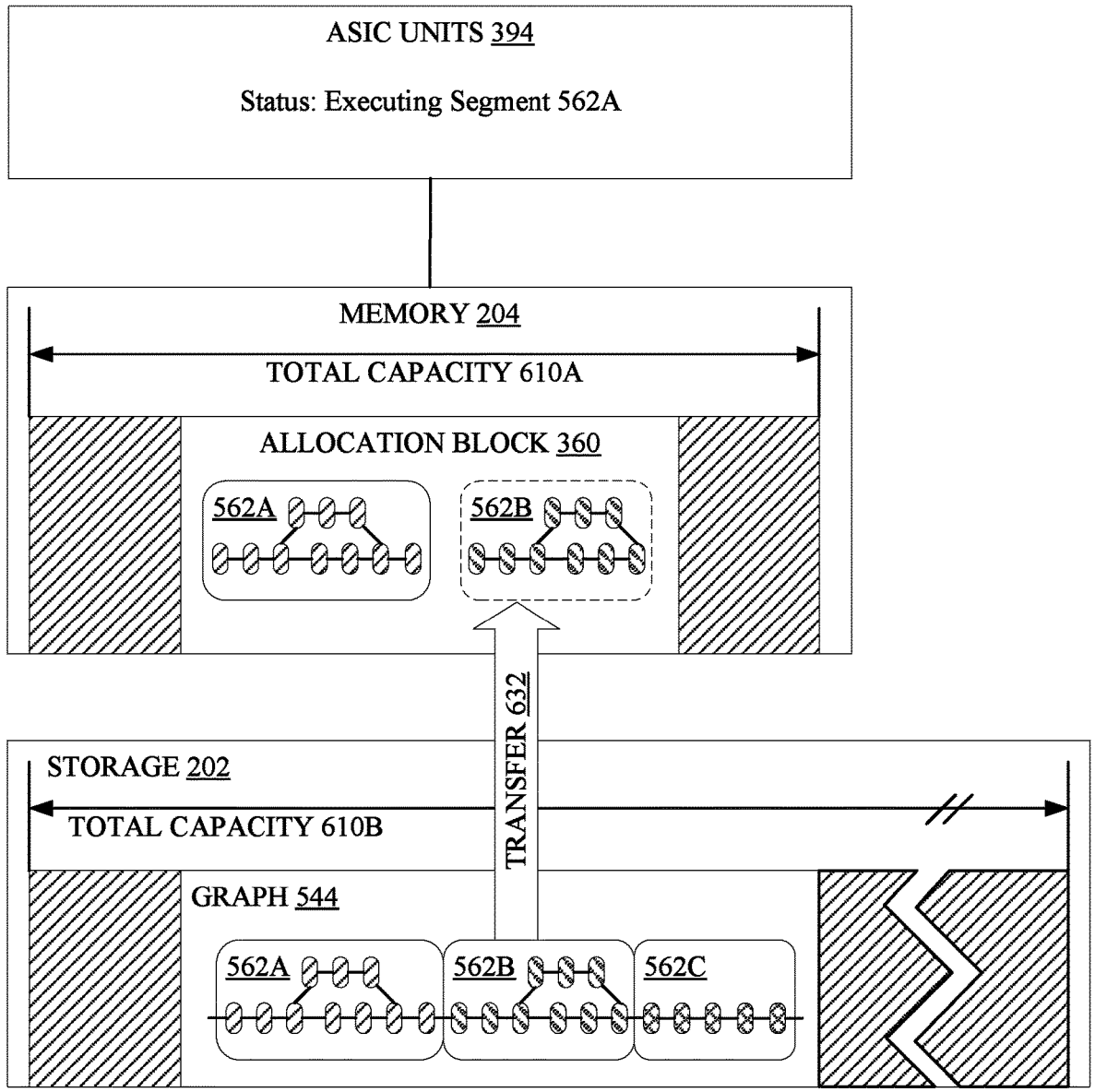
Figure 6C:
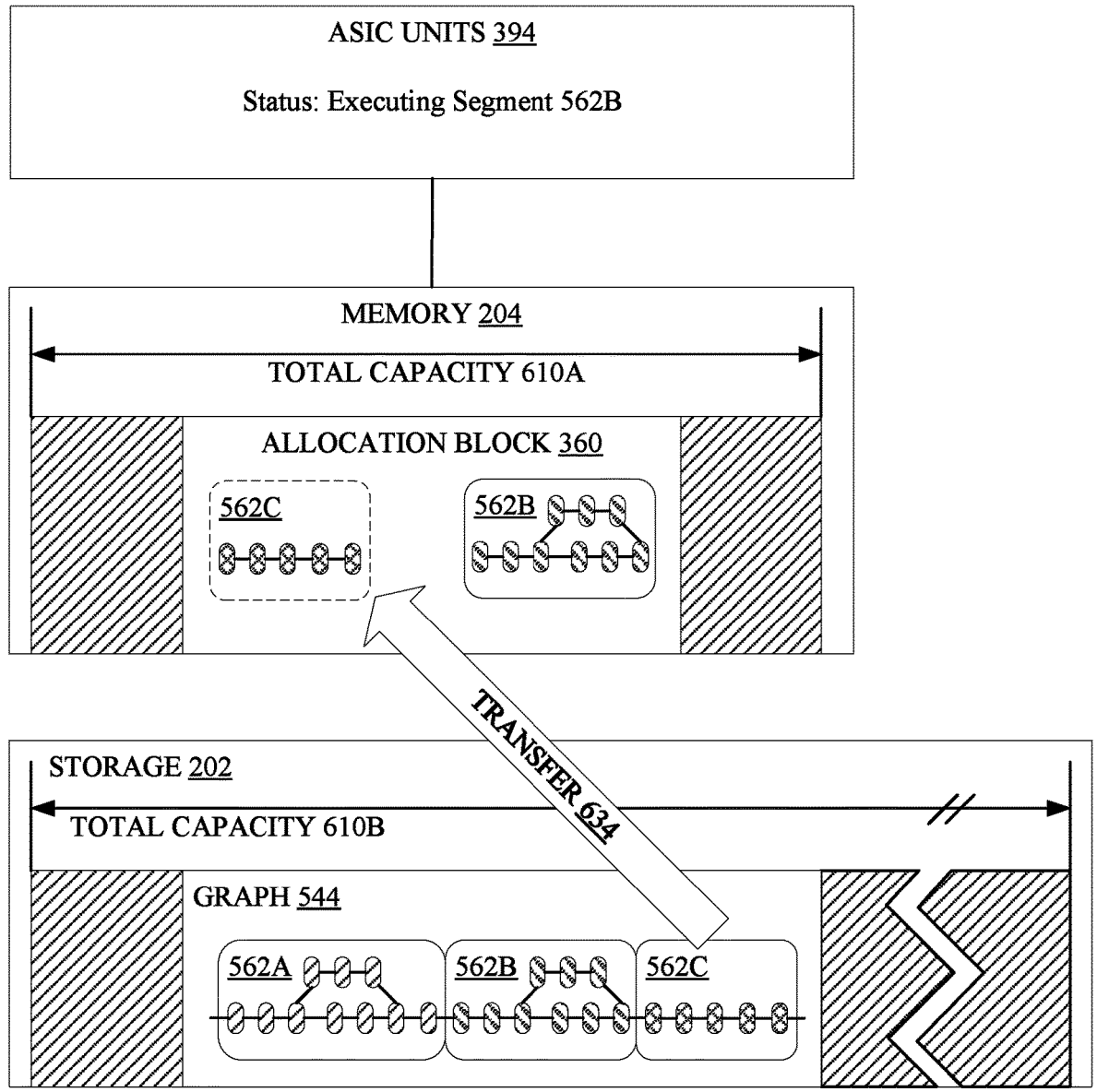

FIGS. 6A, 6B, and 6C illustrate example stages of loading and executing ML models from memory, in accordance with one or more implementations. Referring to FIG. 6A, the total capacity 610A of memory 204 may be limited due to power efficiency and other considerations, which in turn limits the size of allocation block 360. On the other hand, the total capacity 610B of storage 202 may be larger, such as orders of magnitude larger, than total capacity 610A, enabling, for example, storage of ML model library 310 and ML use case library 340, as shown in FIG. 3. However, since graph 544 may be a large combined graph with several ML models, graph 544 may not completely fit into allocation block 360.

Advantageously, since organizer 352 may have divided graph 544 into segments 562A-562C wherein two segments can fit into allocation block 360, portions of graph 544 may be loaded into memory 204 in a multi-stage sliding window fashion to accommodate the size limitations of allocation block 360. Thus, for example, a first stage may correspond to a loading of a first segment, or transfer 630 of segment 562A from storage 202 into allocation block 360 of memory 204. Memory manager 354 may manage the loading of segments, such as segment 562A, into specific addresses of allocation block 360. The segments 562A-562C of graph 544 may be most optimally executed on specific types of processors, such as ASIC units 394, which may be initially idle as shown. Other graphs may indicate one or more other types of processors, such as CPU cores 390 and/or GPU cores 392, as most optimal for processing the respective graph.

After transfer 630 completes, referring to FIG. 6B, a second stage may correspond to a loading of a second segment while the first segment is processed. Thus, as shown in FIG. 6B, ASIC units 394 may process segment 562A while transfer 632 concurrently loads segment 562B from storage 202 into allocation block 360 of memory 204. For example, parallelizable portions of segment 562A, e.g. processing nodes such as node 520, may be distributed across multiple units of ASIC units 394 for parallel processing.

After transfer 632 completes and segment 562A is executed, referring to FIG. 6C, a third stage may correspond to a loading of a third segment while the second segment is processed. Thus, as shown in FIG. 6C, ASIC units 394 may process segment 562B, while transfer 634 concurrently loads segment 562C from storage 202 into allocation block 360 of memory 204. Memory manager 354 may handle the deallocation of segment 562A, which is no longer needed for processing graph 544, as well as the allocation of a new address for segment 562C in allocation block 360.

In a fourth stage, not specifically shown, segment 562C may be processed by ASIC units 394 to provide a final output from graph 544. In this particular example for use case 342A, the output may correspond to a synthesized voice providing a response to a user's voice assistant inquiry, wherein the output can be directed to an audio output such as a speaker or headphone. Note that when using the multi-stage process described above as provided by runtime 350, the total latency or time period 420 is greatly reduced, as shown in FIG. 4B. Accordingly, the electronic device 102 is able to provide a highly responsive user experience while still maintaining power efficiency. For explanatory purposes, allocation block 360 is described as being able to store two segments concurrently. However, in one or more implementations, allocation block 360 may be able to store three, four, or any number of segments concurrently.

Figure 7:
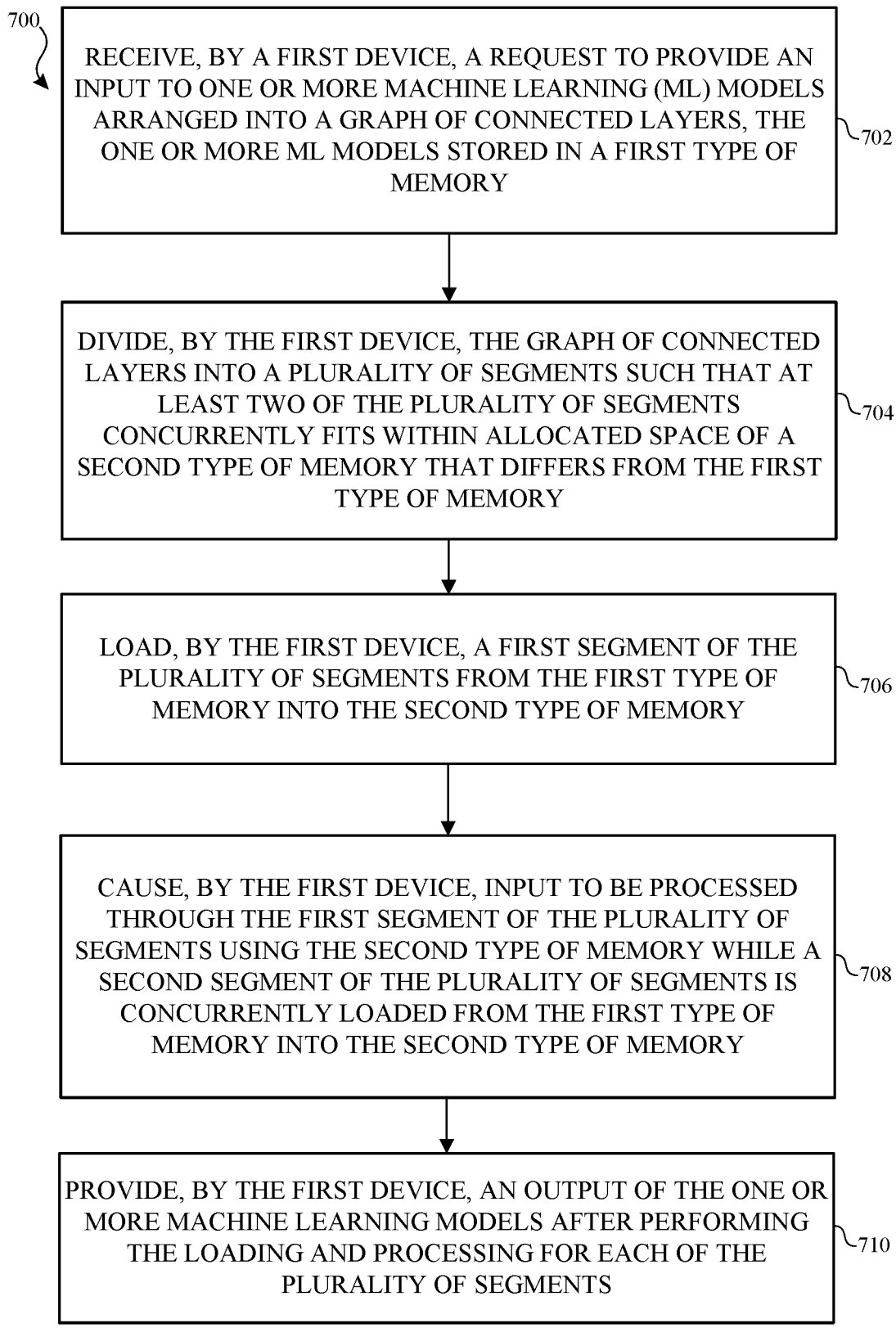
FIG. 7 illustrates a flow diagram of an example process for loading and executing ML models from memory, in accordance with one or more implementations.

FIG. 7 illustrates a flow diagram of an example process for loading and executing ML models from memory, in accordance with one or more implementations. For explanatory purposes, the process 700 is primarily described herein with reference to the electronic devices 102, 106, 108 and 110 of FIG. 1. However, the process 700 is not limited to the electronic devices 102, 106, 108 and 110, and one or more blocks (or operations) of the process 700 may be performed by one or more other components and/or other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 102 receives a request to provide an input to one or more machine learning (ML) models arranged into a graph of connected layers, the one or more ML models stored in a first type of memory (702). Referring to FIG. 3, this may correspond to electronic device 102 receiving a request, e.g. from an voice assistant application, to provide an input, e.g. a user voice recording, to models 312A, 312B, and 312C arranged into graph 344A stored in storage 202. The request may be received by organizer 352 of runtime 350, which in turn may identify use case 342A as matching the request. The graph 344A of use case 342A may correspond to a graph of connected layers including models 312A, 312B, and 312C, as shown in e.g. graph 544 of FIG. 5.

The electronic device 102 divides the graph of connected layers into a plurality of segments such that at least two of the plurality of segments concurrently fits within allocated space of a second type of memory that differs from the first type of memory (704). Referring to FIG. 3 and FIG. 5, this may correspond to electronic device 102 executing organizer 352 to divide graph 544 into segments 562A, 562B, and 562C such that at least two of the segments concurrently fits within allocation block 360 of memory 204 that differs from storage 202. As discussed above, the segments may already be pre-staged and defined within stored metadata, such as segment metadata 346A.

The electronic device 102 loads a first segment of the plurality of segments from the first type of memory into the second type of memory (706). Referring to FIG. 6A, this may correspond to electronic device 102 initiating transfer 630 of segment 562A from storage 202 into memory 204.

The electronic device 102 causes the input to be processed through the first segment of the plurality of segments using the second type of memory while a second segment of the plurality of segments is concurrently loaded from the first type of memory into the second type of memory (708). Referring to FIG. 6B, this may correspond to electronic device 102 causing the input (user voice recording) to be processed through segment 562A via ASIC units 394 while segment 562B is concurrently loaded via transfer 632 from storage 202 to memory 204. Similar stages of concurrent loading and processing may be repeated for further segments of graph 544, as described above.

The electronic device 102 provides an output of the one or more machine learning models after performing the loading and processing for each of the plurality of segments (710). For example, the synthesized speech output of graph 544 may be routed to a speaker, headphone, or other audio output device. If the request instead corresponded to use case 342B for portrait photography, then the processed image output may be shown on e.g. a display or other visual output of electronic device 102.

As described above, one aspect of the present technology is the gathering and use of data available from specific and legitimate sources for executing ML models. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for recognizing a spoken command. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of outputting media content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
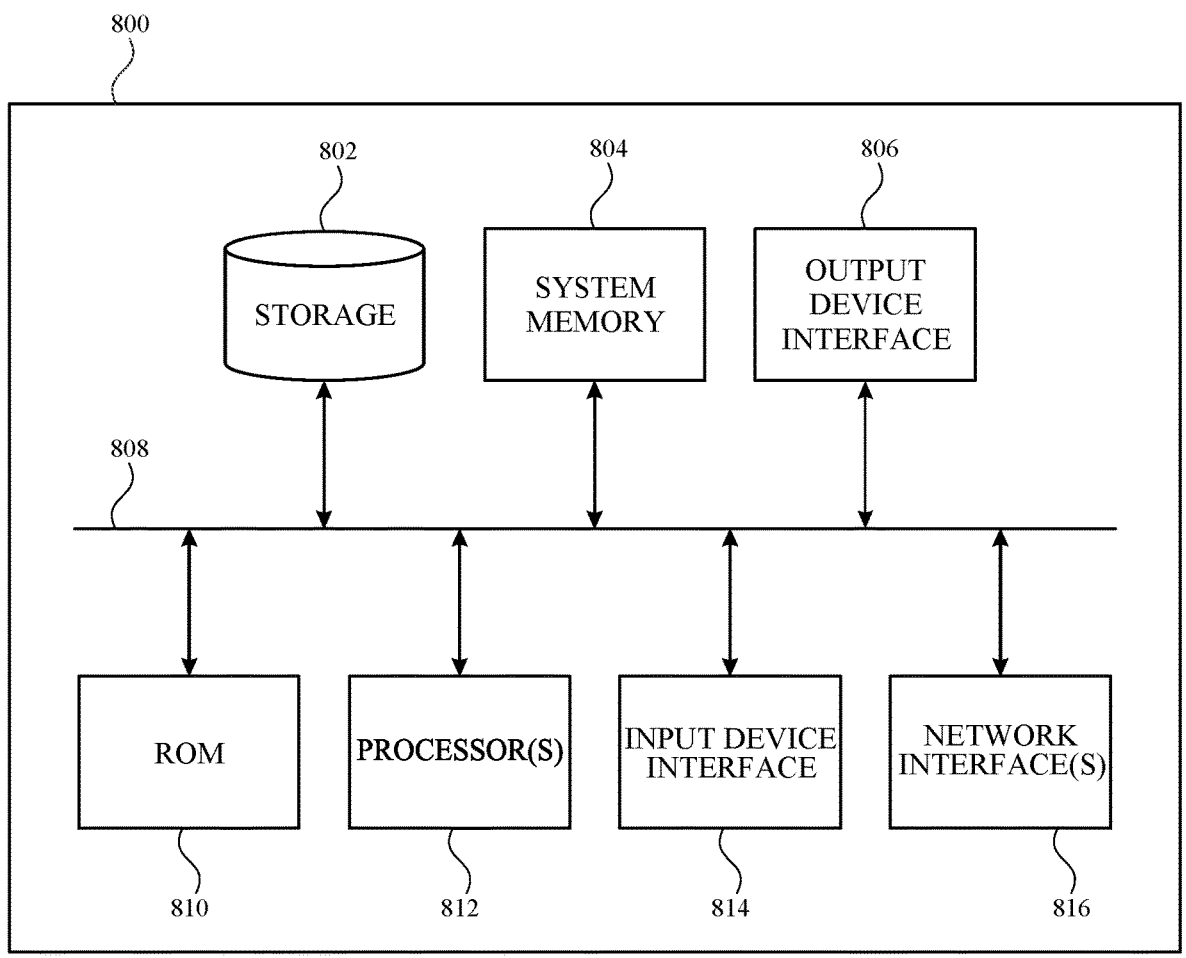
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, one or more of the electronic devices 102-110, and/or one or the servers 114-118 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as one or more of the servers 114-118 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving a request to provide an input to one or more machine learning (ML) models arranged into a graph of connected layers, the one or more ML models stored in a first type of memory;
   dividing the graph of connected layers into a plurality of segments such that at least two of the plurality of segments concurrently fits within allocated space of a second type of memory that differs from the first type of memory;

loading a first segment of the plurality of segments from the first type of memory into the second type of memory;

causing the input to be processed through the first segment of the plurality of segments using the second type of memory while a second segment of the plurality of segments is concurrently loaded from the first type of memory into the second type of memory; and providing an output of the one or more machine learning models after performing the loading and processing for each of the plurality of segments.

2. The method of claim 1, wherein dividing the graph of connected layers is in response to determining that a total memory footprint of the graph of connected layers exceeds the allocated space of the second type of memory.

3. The method of claim 1, wherein the first type of memory is a non-volatile memory, and the second type of memory is a volatile memory.

4. The method of claim 3, wherein the first type of memory comprises NAND flash memory, and wherein the second type of memory comprises dynamic random access memory (DRAM).

5. The method of claim 1, wherein the second type of memory includes a buffer cache for working data when processing the input through each of the plurality of segments.

6. The method of claim 1, wherein dividing the graph of connected layers into the plurality of segments is based on aligning to transitions between the one or more ML models.

7. The method of claim 1, wherein dividing the graph of connected layers into the plurality of segments is based on minimizing state information carried between the plurality of segments.

8. The method of claim 1, wherein after causing the input to be processed through the first segment, the method further comprises:

loading a third segment of the plurality of segments from the first type of memory into the second type of memory to replace the first segment stored therein; and causing the input to be processed through the second segment using the second type of memory while the third segment is concurrently loaded from the first type of memory into the second type of memory.

9. The method of claim 1, wherein the plurality of segments are predetermined from stored metadata associated with the graph of connected layers.

10. The method of claim 1, wherein the graph of connected layers is retrieved in an interleaved format optimized for parallel processing.

11. The method of claim 1, wherein the output comprises at least one of a visual output and an audio output.

12. The method of claim 1, wherein causing the input to be processed through the first segment comprises:

distributing parallelizable portions of the first segment for processing across multiple computing units of at least one of: one or more general purpose processors, one or more graphics processing units (GPUs), and one or more application specific integrated circuits (ASICs).

13. A device, comprising:

a first type of memory;

a second type of memory that differs from the first type of memory; and at least one processor configured to:

receive a request to provide an input to one or more machine learning (ML) models arranged into a graph of connected layers, the one or more ML models stored in the first type of memory;

divide the graph of connected layers into a plurality of segments such that at least two of the plurality of segments concurrently fits within allocated space of the second type of memory;

load a first segment of the plurality of segments from the first type of memory into the second type of memory;

cause the input to be processed through the first segment of the plurality of segments using the second type of memory while a second segment of the plurality of segments is concurrently loaded from the first type of memory into the second type of memory; and provide an output of the one or more machine learning models after performing the loading and processing for each of the plurality of segments.

14. The device of claim 13, wherein the first type of memory is a non-volatile memory, and the second type of memory is a volatile memory.

15. The device of claim 13, wherein the at least one processor is configured to divide the graph of connected layers into the plurality of segments based on aligning to transitions between the one or more ML models.

16. The device of claim 13, wherein the at least one processor is configured to divide the graph of connected layers into the plurality of segments based on minimizing state information carried between the plurality of segments.

17. The device of claim 13, wherein after causing the input to be processed through the first segment, the at least one processor is further configured to:

load a third segment of the plurality of segments from the first type of memory into the second type of memory to replace the first segment stored therein; and cause the input to be processed through the second segment using the second type of memory while the third segment is concurrently loaded from the first type of memory into the second type of memory.

18. The device of claim 13, wherein the plurality of segments are predetermined from stored metadata associated with the graph of connected layers.

19. A computer program product comprising code, stored in a non-transitory computer-readable storage medium, the code comprising:

code to receive, by a first device, a request to provide an input to one or more machine learning (ML) models arranged into a graph of connected layers, the one or more ML models stored in a first type of memory;

code to divide, by the first device, the graph of connected layers into a plurality of segments such that at least two of the plurality of segments concurrently fits within allocated space of a second type of memory that differs from the first type of memory;

code to load, by the first device, a first segment of the plurality of segments from the first type of memory into the second type of memory;

code to cause, by the first device, the input to be processed through the first segment of the plurality of segments using the second type of memory while a second segment of the plurality of segments is concurrently loaded from the first type of memory into the second type of memory; and code to provide, by the first device, an output of the one or more machine learning models after performing the loading and processing for each of the plurality of segments.

20. The computer program product of claim 19, wherein the code to divide, by the first device, the graph of connected layers into the plurality of segments is based on at least one of: aligning to transitions between the one or more ML models, minimizing state information carried between the plurality of segments, and minimizing a size deviation between the plurality of segments.

* * * * *